United States Patent

Kaiho et al.

[15] 3,696,172
[45] Oct. 3, 1972

[54] PROCESS FOR PREPARING STYRENE POLYMERS HAVING A HIGH IMPACT STRENGTH

[72] Inventors: Isao Kaiho, Yokohama; Hiroshi Shimizu, Kawasaki; Hiroshi Osuka, Yokohama, all of Japan

[73] Assignee: Nihon Polystyrene Kogyo Kabushiki Kaisha, Kanagawa, Japan

[22] Filed: Oct. 19, 1970

[21] Appl. No.: 82,193

Related U.S. Application Data

[63] Continuation-in-part of Ser. No. 657,065, July 31, 1967, abandoned.

[52] U.S. Cl. ..........................260/880 R, 260/93.5 W
[51] Int. Cl. ..........................C08f 19/08, C08f 1/11
[58] Field of Search ....................260/880 R, 93.5 W

[56] References Cited

UNITED STATES PATENTS 3,047,534   7/1962   Dyer et al. ..................260/880
3,425,966   2/1969   Ronden et al. ........260/93.5 W
3,449,311   6/1969   Lowell......................260/93.5

*Primary Examiner*—James A. Seidleck
*Attorney*—Sughrue, Rothwell, Mion, Zinn & Macpeak

[57] ABSTRACT

Process for the production of high impact polystyrenic polymers comprising dissolving 3–10 parts by weight of a polybutadiene rubber and/or a styrene butadiene rubber in 100 parts of a styrenic monomer, polymerizing the solution under conditions of bulk polymerization in the absence of a catalyst or initiator until the solid content in the solution becomes from about 15 to 45 percent by weight, dispersing the polymerization product in water to provide an aqueous suspension, and polymerizing the aqueous suspension under the conditions of suspension polymerization in the presence of from 0.1 to 1 part by weight of t-butyl per-iso-butyrate and from 0.01 to 0.5 parts by weight of t-butyl peracetate.

8 Claims, No Drawings

PROCESS FOR PREPARING STYRENE POLYMERS HAVING A HIGH IMPACT STRENGTH

CROSS-REFERENCE TO RELATED APPLICATION

This application is a continuation-in-part of U.S. Ser. No. 657,065, filed July 31, 1967, entitled "Process for Preparing a Polystyrenic Polymer Having a High Impact Strength" now abandoned.

BACKGROUND OF THE INVENTION

1. Field of the Invention

The present invention relates generally to a process for preparing economically a polystyrenic polymer having a high impact strength in a manner which is very easy and requires only a short period of time as compared with conventional methods. In particular, the present invention relates to a process for preparing a polystyrenic polymer having a high impact strength by a bulk polymerization-suspension polymerization system, which comprises dissolving 3–10 parts by weight of a polybutadiene rubber and/or a styrene butadiene rubber in 100 parts of a styrenic monomer, polymerizing the solution under conditions of bulk polymerization in the absence of a catalyst until the solid content in the solution becomes from about 15 to 45 percent by weight, dispersing the polymerization product in water to provide an aqueous suspension, and polymerizing the aqueous suspension under the conditions of suspension polymerization in the presence of from 0.1 to 1 part by weight of t-butyl per-iso-butyrate and from 0.01 to 0.5 parts by weight of t-butyl peracetate for from 1 to 10 hours at a temperature of 80° to 100° C., for from 1 to 5 hours at from 100° to 120° C., and for from 1 to 5 hours at a temperature of 120° C. to 145° C.

2. Description of the Prior Art

Hitherto, various attempts have been proposed to increase the impact strength of polystyrenic polymers. Among them, the most generally adopted method is one wherein a rubber like material such as polybutadiene rubber is incorporated in the polystyrenic polymers. Also, methods have been studied to provide an effective impact strength to the polymers by the use of a reduced amount of the rubber like material. It has already been discovered that by dissolving the rubber like material into the styrene monomer and then polymerizing the solution to provide an interpolymer, undesirable problems occurring in the case of using the rubber like material, such as, reduction in tensile strength, softening temperature, weathering resistance and workability can be overcome to some extent. Also, it is known that for producing such an interpolymer there may be used a conventional procedure, such as, bulk polymerization, solution polymerization, suspension polymerization and emulsion polymerization.

Although bulk polymerization is preferable, since it can provide products having excellent properties, it is very difficult to remove the heat generated in the polymerization and control the reaction, and the tendency becomes more remarkable when the viscosity of the system is increased as the polymerization progresses. In solution polymerization, the removal of solvent from the polymer is difficult. Also, in emulsion polymerization, impurities tend to remain in the products. For these reasons, a method has recently been proposed as one of the profitable ones in which a styrenic monomer having dissolved therein a rubber like material is subjected to bulk polymerization only in the period when the reaction can be easily controlled by removing the heat of polymerization from the reaction system, and then the solution containing a polymer formed by the polymerization of a part of the monomer is subjected to suspension polymerization (hereinafter, the solution containing the polymer is called the "intermediate polymer").

In general, the polymerization of styrenic monomers, the use of polymerization initiators is usually preferable, although it is not always necessary.

Also, as the initiators for the suspension polymerization in the above-mentioned known two-step polymerization system, there are known organic peroxides, such as, dibenzoyl peroxide, dilauroyl peroxide and di-t-butyl peroxide. Since each of these organic peroxides has a specific optimum temperature range in the case of using them as the polymerization initiators, the kinds of initiator, polymerization temperature and other conditions have fine and unexpectable influences on the properties of polystyrenic polymers thus prepared and hence the selection of the reaction conditions is important.

It is of course economical to conduct the bulk polymerization at a high polymerization rate in a short period of time. For conducting the bulk polymerization at a high rate of polymerization, it is desirable to maintain the heat conductivity of the system high, so that the heat of reaction can be smoothly removed and the temperature of the system can be easily controlled, and for the purpose, it is more preferable to operate when the viscosity of the system is lower. Further, considering the influences on the dispersion of the intermediate polymer in water and the grain size distribution of the dispersion particles, it is profitable that the viscosity of the intermediate polymer also be lower.

However, when a comparatively high polymerization temperature is employed in the case of subjecting to suspension polymerization a dispersion system wherein an intermediate polymer having a low viscosity is dispersed in water, the rubber like material that has been dispersed finely in the intermediate polymer tends to be aggregated into large particles, which results in making the grain sizes and shapes of particles very irregular. This is called the "macro-gelation" phenomenon.

If the macro-gelation occurs, the impact strength of the final product is not improved, the moldability is reduced and the gloss of the molded articles is lowered. Also, in suspension polymerization at a high temperature, the suspension system must be maintained stably, but the maintenance is not only technically difficult, but also requires a complicated control system, which makes the polymerization unprofitable.

On the other hand, if a lower suspension polymerization temperature is employed, the polymerization period is prolonged, and the monomer remains in the polymer thus formed. The presence of the monomer in the polymer reduces the softening temperature of the final polymer and reduces the dimensional stability of articles of the polymer. If it is desired to avoid the entrance of the monomer is the polymer formed for overcoming the technical difficulties, a very long polymerization period of time is required which is economically unprofitable.

SUMMARY OF THE INVENTION

The inventors have studied ways for overcoming such various technical difficulties in conventional methods and for providing an improved two step polymerization method of the above-mentioned bulk polymerization in the absence of an initiator and the suspension polymerization in the presence of a polymerization initiator capable of producing a polystyrenic polymer having an improved gloss and a high impact strength. As the result of the studies, it has been found that the reaction control and operation can be very easily conducted and a polystyrenic polymer having an improved impact resistance can be economically produced in a short period of time by carrying out the polymerization in such manner that 3–10 parts by weight of at least one of polybutadiene rubber and a styrene polybutadiene rubber is dissolved into 100 parts by weight of a styrenic polymer, the solution thus formed is subjected to bulk polymerization in the absence of initiator, until the solid content in the solution becomes from about 15 to 45 percent by weight, an intermediate polymer obtained by the bulk polymerization under the specific conditions is dispersed in water to provide an aqueous dispersion, and the aqueous suspension is subjected to the suspension polymerization under the presence of the specific combination of polymerization initiators and the specific amount thereof as heretofore described while controlling the polymerization temperature and the polymerization time in three steps as shown.

Moreover, it has been found that for producing an excellent polystyrenic polymer, besides the necessary condition of employing the two step polymerization composed of the bulk polymerization step under the above-mentioned specific conditions and the suspension polymerization step under the above-mentioned specific conditions, the above-mentioned three step conditions of for from 1 to 10 hours at a temperature of 80° to 100° C., for from 1 to 5 hours at from 100° to 120° C., and for from 1 to 5 hours at a temperature of 120° C. to 145° C. must be observed.

Therefore, an object of this invention is to provide a remarkably improved two-step polymerization for producing a polystyrenic polymer.

According to the process of this invention, by conducting the above-mentioned three-step suspension polymerization using the specific combination of polymerization initiators *The two initiators are the sole initiators present and using specific amounts of them, the polymerization is started at a low temperature at the beginning of the suspension polymerization and the suspension system is maintained stably and a polymer having a low viscosity is formed without being accompanied by the occurrence of the macro-gelation phenomenon of the rubber like material. Thereafter, when the polymerization further proceeds to such extent that the viscosity of the polymer suspended in water is increased and the fears of macro-gelation of the rubber like material and of suspension destruction have vanished, the temperature of the system is increased and the fears of macro-gelation of the rubber like material and of suspension destruction have vanished, the temperature of the system is increased to convert the suspension polymerization step from the first step to the second step, and thereafter the third polymerization step at higher polymerization temperature can be finished by promoting the polymerization.

Thus, according to this invention, the bulk polymerization and the suspension polymerization can be finished in a short period of time and a polystyrenic polymer containing a reduced amount of monomer and having excellent moldability, gloss and impact resistance can be obtained.

We the inventors are not definitely certain why the impact strength of the polymer is improved when the suspension polymerization under the conditions of specific temperatures is carried out in the presence of a combination of the above described initiators. However, the results may be explained in the following way. If the rubber like material the polystyrenic polymer is to serve to improve the impact strength and moldability, it is required that the rubber like material be dispersed in the polymer as particles having a suitable size and form, and such a dispersion can be accomplished when the styrenic monomer is graft-polymerized with the rubber particles to a suitable degree and the rubber is in a suitably gelled condition.

Since graft polymerization and gelation are affected by various conditions on the styrenic monomer, particularly the kinds of the initiators, it may be supposed that the effects of the above-described combined initiators on the molecular of the rubber like material lead to more preferable graft polymerization, as compared with the previous initiators conventionally employed. More particularly, it may be supposed that the difference in the effect between the combined initiators to be employed in accordance with the present invention and previously generally used initiators, such as dibenzoyl peroxide and dilauroyl peroxide, is due mainly to the structures of the free radicals formed from each of them, and the above described combination of the amounts of t-butyl isobutyrate and t-butyl peracetate is believed to also be superior in its total or average effect without causing excess graft polymerization.

DETAILED DESCRIPTION OF THE INVENTION

The styrenic monomers used in this invention include styrene and styrene derivatives, e.g., an $\alpha$-substituted styrene, such as, a methylstyrene and a nucleus substituted styrene, such as, o-chloro-styrene and vinyltoluene or a mixture thereof. Moreover, other monomers capable of being copolymerized with these monomers, such as, acrylonitrile, and methyl methacrylate may be used. Therefore, the term of styrenic monomer in this invention includes all of these monomers.

For improving the stability of the suspension system, the use of a suspension stabilizer is particularly profitable. As the stabilizer used in this invention, there are illustrated particles of weakly water soluble inorganic materials, such as, calcium carbonate and magnesium phosphate, or water-soluble high molecular weight materials such as polyvinyl alcohol, or combinations of these materials with surface active agents.

In the bulk polymerization step of this invention there may be used a conventional polymerization controlling agent such as n-dodecyl-mercaptan and a fluidity-aiding agent or a lubricant such as liquid paraffin and n-butyl stearate.

Now, the invention will be explained referring to the preferred examples of this invention, in which percent and parts are by weight.

EXAMPLE 1

A mixture of 100 parts of a styrene monomer, 8 parts of polybutadiene (Diene 35 NF), 4 parts of n-butyl stearate and 0.1 part of t-dodecylmercaptan was subjected to bulk polymerization for 6 hours at 110° C. The solid content of the intermediate polymer thus formed was 28 percent.

Then, the intermediate polymer was added with stirring into a dispersion medium consisting of 100 parts of water, 0.3 parts of calcium phosphate, 0.01 part of sodium dodecyl-benzene sulfonate and 0.5 parts of polyvinyl alcohol to provide an aqueous dispersion.

After the addition of 0.41 parts of t-butyl per-isobutyrate and 0.27 parts of t-butyl peracetate, the suspension was polymerized for 3 hours at 100° C., for one hour at 110° C., for 3 hours at 125° C., and one hour at 145° C.

After cooling, the polymer was separated from water, washed with diluted hydrochloric acid and water, and dried. The polymer thus obtained was hot pressed into a test piece and the physical properties thereof were tested. The results are as follows:

| | |
|---|---|
| Izod impact strength (ft.-lb./in.-notch) | 2.0 |
| Flow rate (g./10 min.) | 2.5 |
| Softening temperature(°C.) | 97 |

EXAMPLE 2

A mixture of 100 parts of styrene monomer, 8 parts of polybutadiene, 4 parts of n.-butyl stearate and 0.1 parts of normal dodecylmercaptan was subjected to bulk polymerization at a temperature of 115° C. for 5 hours and there was obtained an intermediate polymer with solids content of 30 percent.

Using the same dispersion medium and catalyst as employed in Example 1, the intermediate polymer was subjected to suspension polymerization, under the same polymerization conditions, followed by working up. The physical properties of the resulting polymer are as follows.

| | |
|---|---|
| Izod impact strength (ft.-lb./in.-notch) | 2.1 |
| Flow rate (g./10 min.) | 1.8 |
| Softening temperature (°C.) | 106 |

EXAMPLE 3

100 parts of styrene monomer, 5.5 parts of styrenebutadiene rubber (Plioflex 1006*), 4 parts of n-butyl stearate and 0.1 parts of normal dodecylmercaptan were placed in a reaction chamber and subjected to bulk polymerization at 110° C. for 6 hours until a solids content of 28 percent was obtained.

Subsequently, the resulting intermediate polymer was placed in a dispersion medium consisting of 100 parts of water, 0.25 parts of tri-calcium phosphate, 0.002 parts of sodium dodecylbenzene sulfonate and 0.2 parts of polyvinyl alcohol and dispersed with stirring.

Into the suspension were added 0.32 parts of t-butyl perisobutyrate and 0.38 parts of t-butyl peracetate followed by polymerization, at a temperature of 100° C. for 2 hours, at 110° C. for 1.5 hours, at 125° C. for 2 hours and at 145° C. for 1 hour.

The polymer obtained after working up in a similar manner as described in Example 1 has the following physical properties.

| | |
|---|---|
| Izod impact strength (ft.-lb./in.-notch) | 1.7 |
| Flow rate** (g./10 min.) | 14 |
| Softening temperature*** (°C.) | 96 |

EXAMPLE 4

The intermediate polymer obtained in Example 2 was added into a dispersion having the following ingredients and dispersed with stirring.

| | |
|---|---|
| Water | 100 parts |
| Calcium phosphate | 0.3 parts |
| Sodium dodecylbenzene sulfonate | 0.01 parts |
| Polyvinyl alcohol | 0.5 parts |

Into the suspension 0.27 parts of t-butyl perisobutyrate and 0.27 parts of t-butyl peracetate were added and the polymerization was carried out at a temperature of 80° C. for 10 hours, at 110° C. for 3 hours and at 135° C. for 3 hours.

After working up as in Example 1, the resulting polymer had the following physical properties.

| | |
|---|---|
| Izod impact strength (ft.-lb./in.-notch) | 2.0 |
| Flow rate (g./10 min.) | 2.0 |
| Softening temperature (°C.) | 104 |

Comparative example:

The bulk polymerization was carried out as in Example 1 and the resulting intermediate polymer was dispersed in the dispersion medium in the same way. The suspension polymerization was effected under the same conditions as in Example 1 with the exception that there were employed as the polymerization initiator 0.6 parts of t-butyl perisobutyrate, followed by working up treatment.

In the polymer thus obtained there remained 0.7 percent of monomer. When it was tested for physical properties, the impact strength and flow characteristics were almost the same as those obtained in Example 1, but the softening temperature was 85° C. On continuing further the polymerization at a comparatively high temperature, the content of the remaining monomer was not reduced. To reduce the monomer content to less than about 0.5 percent, where the presence of the monomer gives no bad influence on the polymer, the polymerization had to be carried out at a low temperature for a long period of time, taking, in fact, 20 hours at 100° C.

It must be pointed out that in the suspension polymerization each step is at a temperature higher than the preceding step. This enables the sole two initiators set forth to function in a complementary manner, i.e., t-butyl perisobutyrate to be effective at its preferred 70° to 100° C range and the t-butylperacetate to be effective at its preferred 100°–130° C range. Further, it is preferred that the rubber like material used have a size of 0.1 to 20 microns and be in the form of a sphere for best results, and the bulk polymerization be at 105°–130° C.

While the invention has been particularly shown and described with reference to preferred embodiments

What is claimed is:

1. In a process for preparing a polystyrenic polymer having a high impact strength by a bulk polymerization-suspension polymerization system, which comprises dissolving 3–10 parts by weight of at least one of polybutadiene rubber and a styrene-butadiene rubber into 100 parts of a styrenic monomer selected from the group consisting of styrene, α-methylstyrene, o-chlorostyrene, vinyl toluene and mixtures thereof, bulk-polymerizing the solution without addition of any initiator, until the solid content in the solution becomes 15–45 percent by weight, dispersing the product in water to provide an aqueous suspension thereof and suspension-polymerizing the suspension, the improvement which comprises suspension-polymerizing said suspension in the presence of 0.1–1 parts of t-butyl perisobutyrate and 0.01–0.5 parts of t-butyl peracetate at a temperature of 80°–100° C. for 1–10 hours, at 100°–120° C. for 1–5 hours and at 120°–145° C. for 1–5 hours.

2. The process of claim 1 wherein the rubber is polybutadiene rubber.

3. The process of claim 1 wherein the rubber is styrene-butadiene rubber.

4. The process of claim 1 wherein said rubber is a mixture of polybutadiene and styrene-butadiene rubber.

5. The process of claim 1 wherein said t-butyl perisobutyrate and said t-butyl peracetate are the only catalytic materials present.

6. The process of claim 1 wherein a suspension stabilizer is present in said suspension.

7. The process of claim 6 wherein said suspension stabilizer is selected from the group consisting of calcium carbonate, magnesium phosphate, and polyvinyl alcohol.

8. The process according to claim 1 wherein said polymerization is carried out in the presence of n-dodecyl-mercaptan and a lubricant selected from the group consisting of liquid paraffins and n-butyl stearate.

* * * * *